(12) United States Patent
Sakaue et al.

(10) Patent No.: US 7,843,165 B2
(45) Date of Patent: Nov. 30, 2010

(54) CHARGING APPARATUS

(75) Inventors: Masaaki Sakaue, Hikone (JP); Toshiharu Ohashi, Maibara (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 274 days.

(21) Appl. No.: 11/711,059

(22) Filed: Feb. 27, 2007

(65) Prior Publication Data

US 2007/0216350 A1  Sep. 20, 2007

(30) Foreign Application Priority Data

Feb. 27, 2006  (JP) .............................. 2006-051102

(51) Int. Cl.
*H02J 7/00* (2006.01)

(52) U.S. Cl. ................. 320/107; 320/106; 320/112; 320/114

(58) Field of Classification Search ................. 320/106, 320/107, 110, 111, 112, 113, 114, 116; 429/96, 429/99, 100, 154, 158, 174
See application file for complete search history.

(56) References Cited

U.S. PATENT DOCUMENTS

| 5,739,596 | A | * | 4/1998 | Takizawa et al. | 307/66 |
| 5,844,400 | A | * | 12/1998 | Ramsier et al. | 320/106 |
| 5,861,729 | A | * | 1/1999 | Maeda et al. | 320/106 |
| 5,900,717 | A | * | 5/1999 | Lee | 320/150 |
| 5,909,101 | A | * | 6/1999 | Matsumoto et al. | 320/110 |
| 6,310,460 | B1 | * | 10/2001 | Takagi | 320/106 |
| 6,577,104 | B2 | * | 6/2003 | Sakakibara | 320/132 |
| 6,597,152 | B1 | * | 7/2003 | Jacobs et al. | 320/113 |
| 6,625,477 | B1 | * | 9/2003 | Wakefield | 455/572 |
| 2005/0001593 | A1 | * | 1/2005 | Kawasumi et al. | 320/132 |
| 2005/0225298 | A1 | | 10/2005 | Tashiro et al. | |
| 2006/0022635 | A1 | * | 2/2006 | Li et al. | 320/107 |

FOREIGN PATENT DOCUMENTS

| CN | 2537133 | 2/2003 |
| JP | 06019264 | 3/1994 |
| JP | 07-099731 | 4/1995 |
| JP | 2002-209339 | 7/2002 |
| JP | 2002-320341 | 10/2002 |

OTHER PUBLICATIONS

Office Action issued in corresponding Japanese application 2006-051102, dated May 13, 2010.

* cited by examiner

*Primary Examiner*—Edward Tso
*Assistant Examiner*—M'Baye Diao
(74) *Attorney, Agent, or Firm*—Bacon & Thomas, PLLC (57) ABSTRACT

A charging device for charging battery packs includes charging terminals including a first charging terminal to be connected to an electrode of a first battery pack and a second charging terminal to be connected to an electrode of a second battery pack. Here, the first and the second battery pack are different in kind. Further, the charging device includes a conversion unit for supplying electricity to the first charging terminal when the electrode of the first battery pack is connected to the first charging terminal and supplying electricity to the second charging terminal when the electrode of the second battery pack is connected to the second charging terminal.

16 Claims, 9 Drawing Sheets

CHARGING APPARATUS

FIELD OF THE INVENTION

The present invention relates to a charging device; and, more particularly, to a charging device for battery packs used in electric tools or the like.

BACKGROUND OF THE INVENTION

Figure 8:
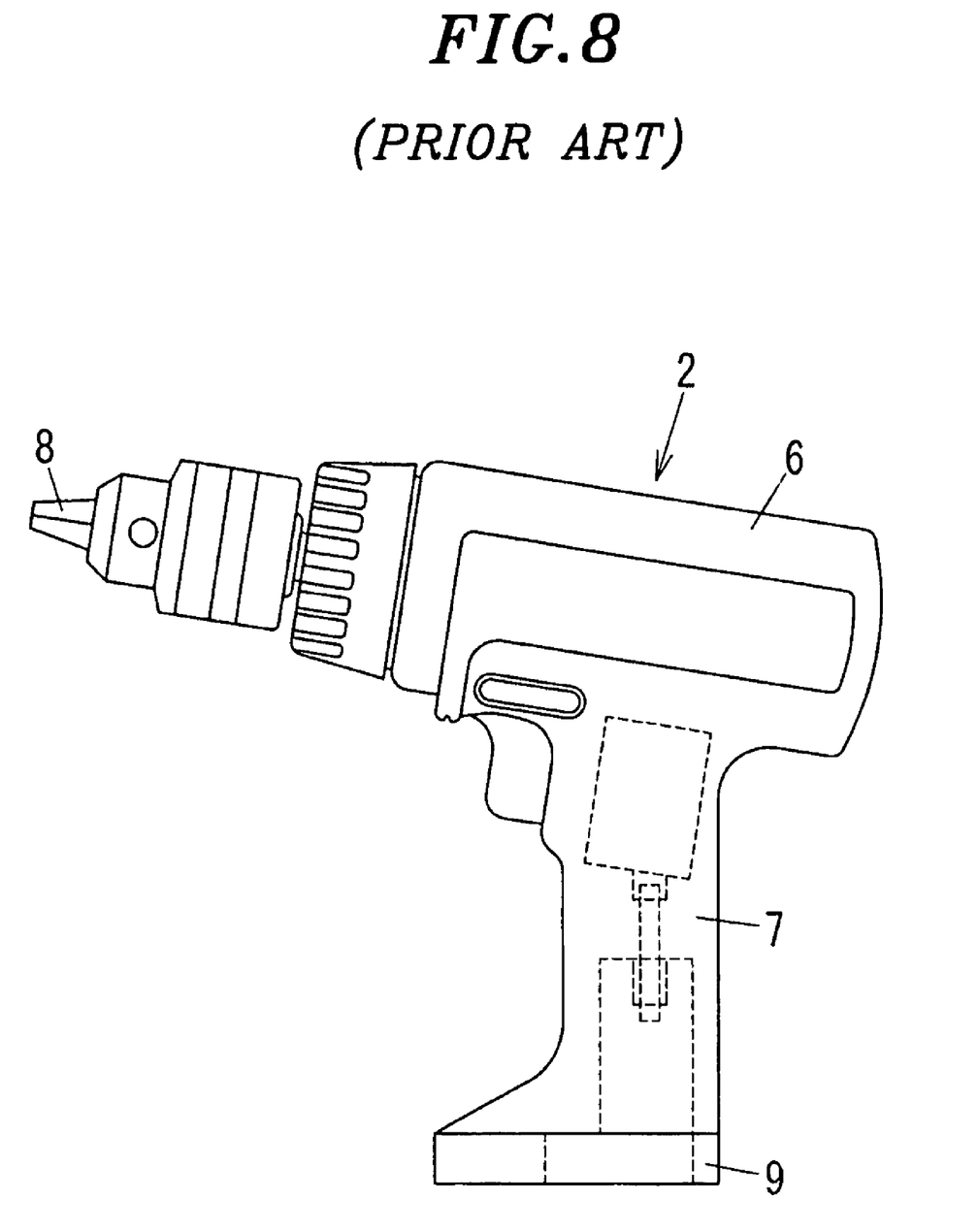
FIG. 8 is a sectional view of a conventional electric tool.
Figure 9A:
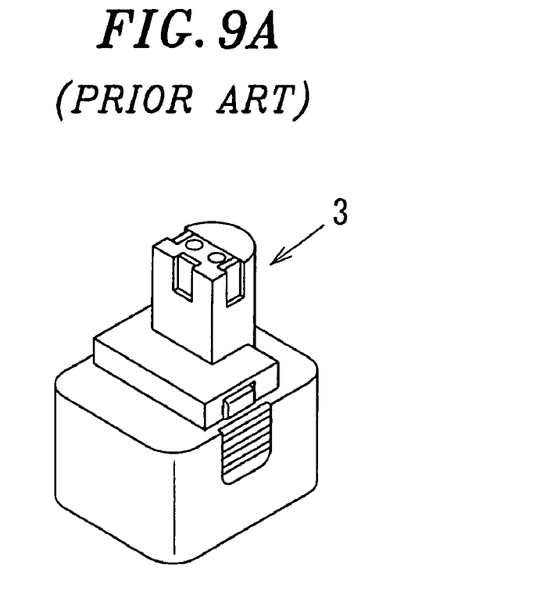
FIG. 9a illustrates a perspective view of a battery pack.

In general, a battery pack 3 shown in FIG. 9a is removably mounted to a charging type electric tool 2 of FIG. 8. Typically, a battery pack having nickel-cadmium batteries (Ni—Cd batteries) or nickel metal hydride batteries (Ni-MH) therein is used as the battery pack 3. Here, the electric tool 2 of FIG. 8 is a pistol type impact driver, in which a handle 7 is extended from one end of a main body 6 in a direction crossing the main body 6. The electric tool 2 is constructed such that an output unit 8 is operated by drive force transmitted from a motor (not shown), which is installed in the main body 6, through a reducer (not shown). Furthermore, a battery pack mounting unit 9 is provided at the end of the handle 7 that is opposite of the main body 6. A battery pack is removably mounted to the battery pack mounting unit 9. Herein, examples of a charging type electric tool and a charging device for charging a battery pack of the charging type electric tool are disclosed in Patent Reference 1 (Japanese Patent Laid-open Publication No. 2005-342796).

Figure 9B:
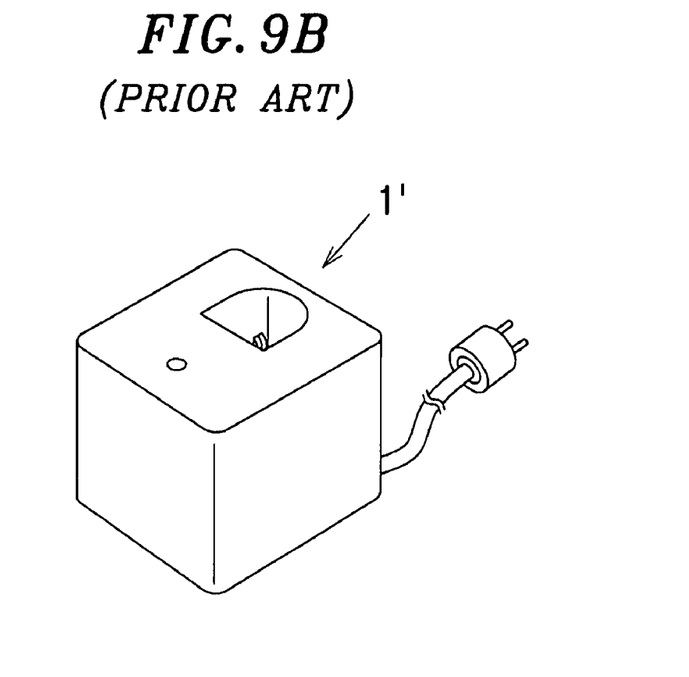
FIG. 9b illustrates a perspective view of a charging device.

In recent years, to reduce the size of the battery pack, a battery pack having lithium-ion batteries has been developed for use. Therefore, at present, electric tools using the former and the latter battery pack are available. Such battery packs are charged, for example, by the charging device 1' of FIG. 9b.

However, since each of the above battery packs must be charged by a dedicated charging device corresponding to each individual battery pack, a number of different charging devices are required. Therefore, when employing electric tools having different types of battery packs, it is inconvenient for users as the same number of charging devices are required.

SUMMARY OF THE INVENTION

It is, therefore, an object of the present invention to provide a small size charging device capable of charging different types of battery pack.

To achieve the object, in accordance with one aspect of the present invention, there is provided a charging device for charging battery packs, including: charging terminals, having a first charging terminal to be connected to an electrode of a first battery pack and a second charging terminal to be connected to an electrode of a second battery pack, which is different in kind from the first battery pack; and a conversion unit for supplying electricity to the first charging terminal when the electrode of the first battery pack is connected to the first charging terminal and for supplying electricity to the second charging terminal when the electrode of the second battery pack is connected to the second charging terminal.

With the above-mentioned construction, the single charging device can charge both the first and second battery packs. Furthermore, because the charging device of the present invention has the conversion unit for supplying electricity to the first charging terminal when the electrode of the first battery pack is connected to the first charging terminal and for supplying electricity to the second charging terminal when the electrode of the second battery pack is connected to the second charging terminal. Therefore, since it is sufficient to provide only a single charging power supply in the charging device, a reduction in size of the charging device can be achieved.

In addition, the conversion unit may include: a conversion relay having a common terminal connected to a charging power supply, a normally closed terminal connected to the first charging terminal, and a normally open terminal connected to the second charging terminal; and a control unit such that, when the electrode of the first battery pack is connected to the first charging terminal, a contact point of the conversion relay is switched to the normally closed terminal, and, when the electrode of the second battery pack is connected to the second charging terminal, the contact point of the conversion relay is switched to the normally open terminal. Thus, the conversion unit can be realized by a relatively simple construction.

As well, the charging device may further include a first mounting bracket to mount the first battery pack thereto, and a second mounting bracket to mount the second battery pack thereto. The first charging terminal is provided in the first mounting bracket, and the second charging terminal is provided in the second mounting bracket. Therefore, the first battery pack can be charged merely by inserting it into the first mounting bracket, and the second battery pack can be charged merely by inserting it into the second mounting bracket.

Moreover, the first charging terminal serves to charge the first battery pack, comprising a nickel-cadmium battery or a nickel metal hydride battery, and the second charging terminal serves to charge the second battery pack, which includes a lithium-ion battery. Thus, both the first battery pack, including the nickel-cadmium battery or the nickel metal hydride battery, and the second battery pack, including the lithium-ion battery, can be charged by the charging device of the present invention.

As described above, in the present invention, different types of the first and second battery packs can be charged by a single charging device which only requires a single charging power supply type. Therefore, a reduction in size of the charging device can be achieved.

BRIEF DESCRIPTION OF THE DRAWINGS

The above and other objects and features of the present invention will become apparent from the following description of embodiments given in conjunction with the accompanying drawings, in which:

FIG. 9 shows a charging battery set for the electric tool of FIG. 8, wherein

DETAILED DESCRIPTION OF THE EMBODIMENTS

Hereinafter, an embodiment of the present invention will be described in detail with reference to the attached drawings.

Figure 1:
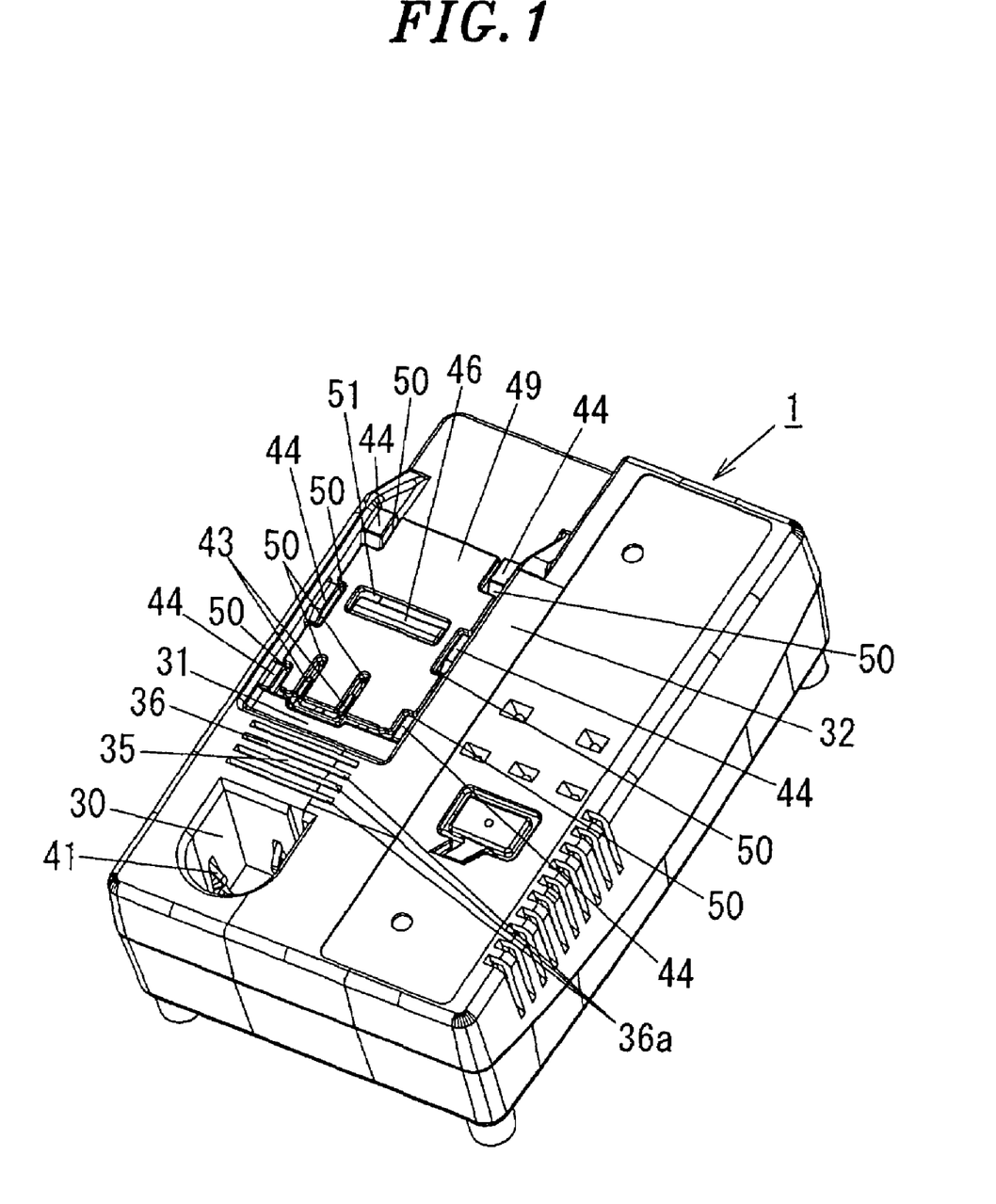
FIG. 1 shows a perspective view of a charging device, in accordance with to an embodiment of the present invention.
Figure 4:
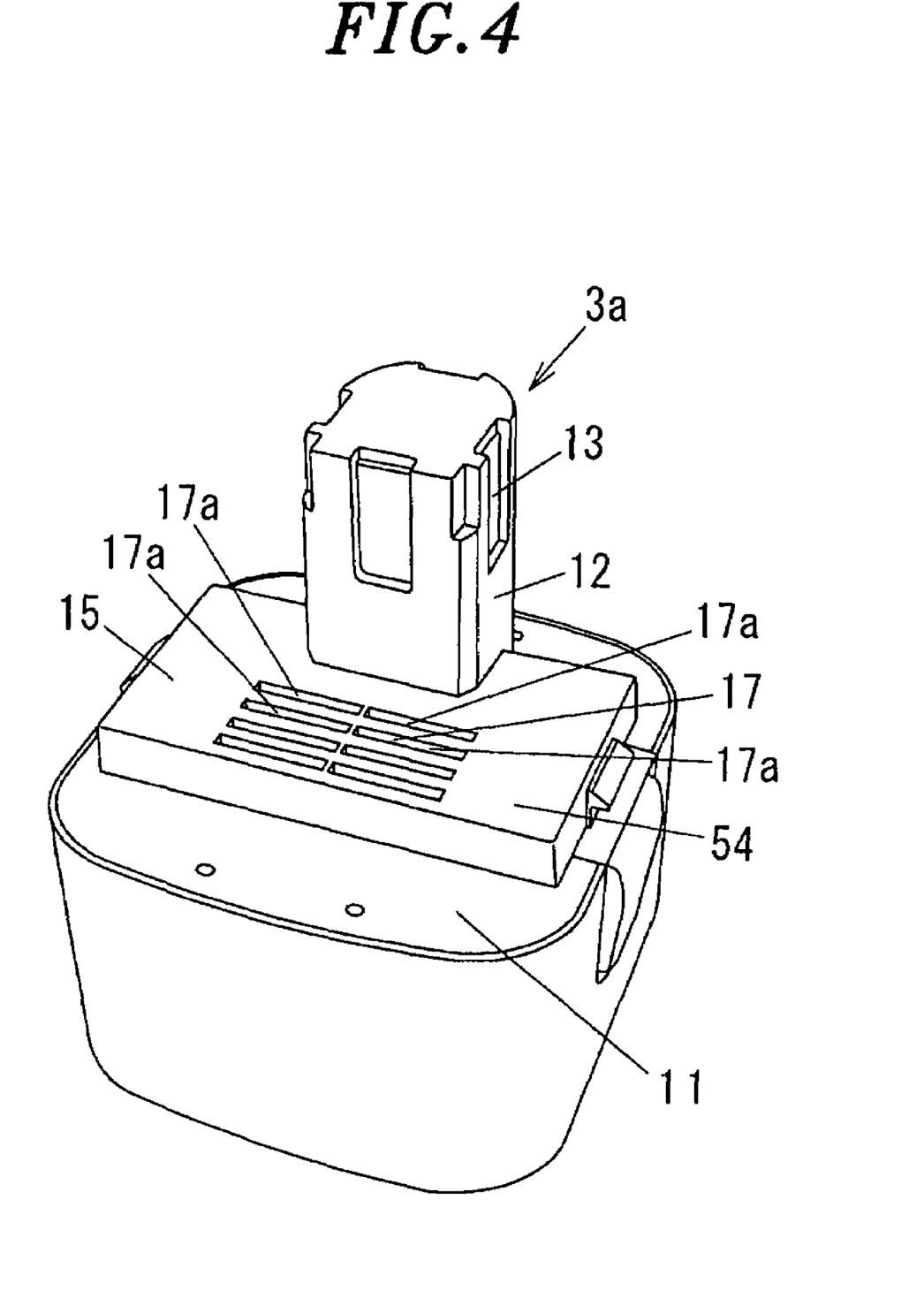
FIG. 4 is a perspective view showing the lower surface of a first battery pack in accordance with the embodiment of the present invention.
Figure 5:
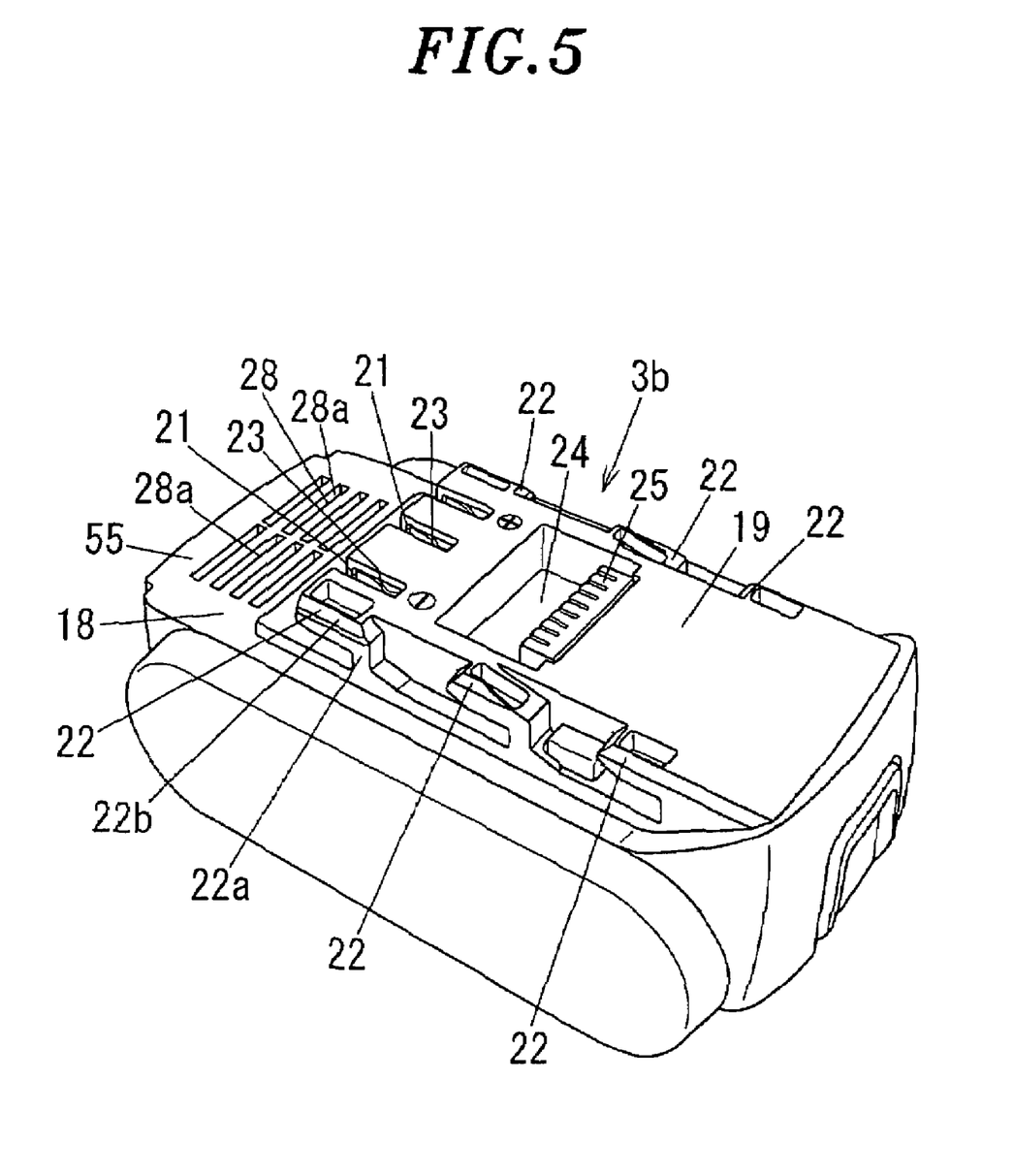
FIG. 5 is a perspective view showing the lower surface of a second battery pack in accordance with the embodiment of the present invention.

A charging device 1 shown in FIG. 1 serves to charge battery packs 3a and 3b (see FIGS. 4 and 5), which are used as secondary batteries for an electric tool 2. The charging device 1 is able to charge two kinds of battery packs, that is, the first battery pack 3a, which is shown in FIG. 4 and has cells 4a (see FIG. 6), each of which is made of a nickel-cadmium battery or a nickel metal hydride battery, and the second battery pack 3b, which is shown in FIG. 5 and has cells 4b (see FIG. 7), each of which is made of a lithium-ion battery. Thus, the charging device 1 and at lease one of the first and second battery packs 3a and 3b, which can be charged by the charging device 1, form a charging battery set. In other words, the charging battery set may include a combination of the charging device 1 and the first battery pack 3a, or may alternatively include a combination of the charging device 1 and the second battery pack 3b. As a further alternative, the charging battery set may include a combination of the charging device 1, the first battery pack 3a and the second battery pack 3b.

In the embodiment, a pistol type electric tool having the same construction as that of the conventional electric tool of FIG. 8 is used as an example of the electric tool 2 to which the first battery pack 3a or the second battery pack 3b is mounted. Therefore, further explanation of the electric tool 2 is deemed unnecessary. Further, the electric tool 2 can use only one of the first and second battery packs 3a and 3b as a power supply. Thus, as for the electric tool 2, it is assumed that there are two kinds of electric tools, which include an electric tool 2 of FIG. 8 having the first battery 3a provided therewith and an electric tool having the second battery pack 3b provided therewith (not shown).

The first and second battery packs 3a and 3b, which are removably mounted to the electric tool and charged by the charging device 1, are in different shapes and sizes as well as being different in kind.

As shown in FIG. 4, the first battery pack 3a includes a first case 11, which has a block shape and defines the external appearance of the first battery pack 3a. The cells 4a are installed in the first case 11 (refer to FIG. 6). A first mounting boss 12, which has an asymmetrical external shape, perpendicularly protrudes downwards from the lower surface of the first case 11, which faces the electric tool 2 when the first battery pack 3a is mounted to the electric tool 2, at a predetermined position spaced apart from the center of the lower surface of the first case 11 towards a first end of the lower surface of the first case 11 by a predetermined distance. Electrodes 13 are provided on the circumferential outer surface of the distal end of the mounting boss 12. A first active connection terminal 14 (see, FIG. 3) is provided at the same portion as the part in which the electrodes 13 are provided. Furthermore, a rectangular support portion 15, which is lower than the first mounting boss 12, protrudes downwards from the central portion of the lower surface of the first case 11 to have a shape such that the support portion 15 surrounds three surfaces of the proximal end of the mounting boss 12. The first mounting boss 12 and the support portion 15 are removably inserted into a battery pack mounting unit 9 of the electric tool 2, and thus the electrodes 13 of the first battery pack 3a are connected to terminals (not shown), which are provided in the battery pack mounting unit 9, in order to supply power to the electric tool 2.

In addition, a first vent port 17, which communicates with the cells 4a provided in the first case 11, is formed in the lower surface of the support portion 15 of the first case 11 between the first mounting boss 12 and the edge of the lower surface of the support portion 15 that is opposite of the first mounting boss 12. The first vent port 17 includes a plurality of slots 17a, which are in parallel with the first surface of the first mounting boss 12 of the first case 11.

As shown in FIG. 5, the second battery pack 3b includes a second case 18, which defines the external appearance of the second battery pack 3b and has a box shape that is planar with respect to that of the first battery pack 3a, and extends a predetermined length in one direction. The cells 4b are installed in the second case 18. A second mounting boss 19 protrudes downwards from the lower surface of the second case 18, which faces the electric tool 2 when the second battery pack 3b is mounted to the electric tool 2, at a predetermined portion other than a first end in a longitudinal direction. The second mounting boss 19 has a rectangular shape which extends a predetermined length in the longitudinal direction of the second case 18. Terminal insertion slots 21, which are open downwards and towards the first end of the second case 18, when viewed in the longitudinal direction thereof, are formed in the first end of the second mounting boss 19, when viewed in the longitudinal direction of the second case 18. Electrodes 23, which are connected to the cells 4b, are provided in respective terminal insertion slots 21. Furthermore, coupling protrusions 22, each of which has an L shape when viewed from one side, integrally protrude outwards from opposite side surfaces of the second mounting boss 19. In the embodiment, several sets (in detail, three sets) of coupling protrusions 22, each set of which includes a pair of coupling protrusions 22, are arranged in the longitudinal direction of the second mounting boss 19. Here, the upper end of a vertical part 22a of each coupling protrusion 22 is integrally level with the lower surface of the second case 18. The second mounting boss 19 and the coupling protrusions 22 are removably inserted into a battery pack mounting unit of the electric tool 2, and thus the electrodes 23 of the second battery pack 3b are connected to terminals (not shown) provided in the battery pack mounting unit in order to supply power to the electric tool 2.

Meanwhile, a depressed portion 24 is formed in the central portion of the lower surface of the second mounting boss 19. A battery side connector 25 protrudes downwards from the bottom end of the depressed portion 24 that is opposite of the first end of the second case 18, when viewed in the longitudinal direction thereof. A second active connection terminal (see, FIG. 3) is provided in the battery side connector 25. In addition, a second vent port 28, which communicates with the cells 4b provided in the second case 18, is formed in the lower surface of the second case 18 between the edge of the first end thereof, as viewed in the longitudinal direction thereof, and the second mounting boss 19, that is, in the lower surface of the first end of the second case 18, as viewed in the longitudinal direction. The second vent port 28 includes a plurality of slots 28a, each of which extends a predetermined length in the transverse direction of the second case 18.

The charging device 1 of FIG. 1 includes a box-shaped housing 32, which is rectangular when seen in a plan view thereof, and defines the external appearance of the charging device 1. A first mounting bracket 30, into which the first mounting boss 12 of the first battery pack 3a is removably inserted, and a second mounting bracket 31, into which the second mounting boss 19 of the second battery pack 3b is removably inserted, are provided in one half of the upper surface of the housing 32, defined on the basis of the longitudinal axis of the housing 32. The first mounting bracket 30 is formed in the first end of the housing 32, when viewed in the longitudinal direction thereof. The second mounting bracket 31 is formed in the housing 32 at a position spaced apart from the first mounting bracket 30 towards the second end of the housing 32 in the longitudinal direction by a predetermined distance. A manipulation portion for manipulating the charging device, for example, for switching the charging mode, and an indication portion for indicating the status of the charging device are provided on one half of the upper surface of the housing 32 that is opposite of the half in which the first mounting bracket 30 and the second mounting bracket 31 are provided.

An air supply port 36 is formed in the upper surface of the housing 32 at an intermediate portion 35 defined between the first mounting bracket 30 and the second mounting bracket 31. The air supply port 36 includes a plurality of slots 36a, each of which extends a predetermined length in a transverse direction. The air supply port 36 communicates with a suction port 38 through an air passage 37 defined in the housing 32 (see FIGS. 6 and 7). The suction port 38 is formed on the groove the lower surface of the housing 32, which is vertically spaced apart from the support surface by support legs 34. Furthermore, as shown, e.g., in FIG. 6, a cooling fan 39 is provided in the housing 32 at a position corresponding to the air supply port 36. Outside air is drawn into the housing 32 through the air suction port 38 by the operation of the cooling fan 39, and then the air is discharged upwards through the air supply port 36.

As shown in FIG. 1, the first mounting bracket 30 of the charging device 1 includes a depressed portion, which is open at the upper end thereof, and into which is mounted the first mounting boss 12 of the first battery pack 3a. Furthermore, first charging terminals 41 are provided in the inner surface of the first mounting bracket 30 at positions corresponding to the respective electrodes of the first battery pack 3a. In addition, a first passive connection terminal 42 (see, FIG. 3) is provided in the inner surface of the first mounting bracket 30 at a position corresponding to the first active connection terminal 14.

Figure 6:
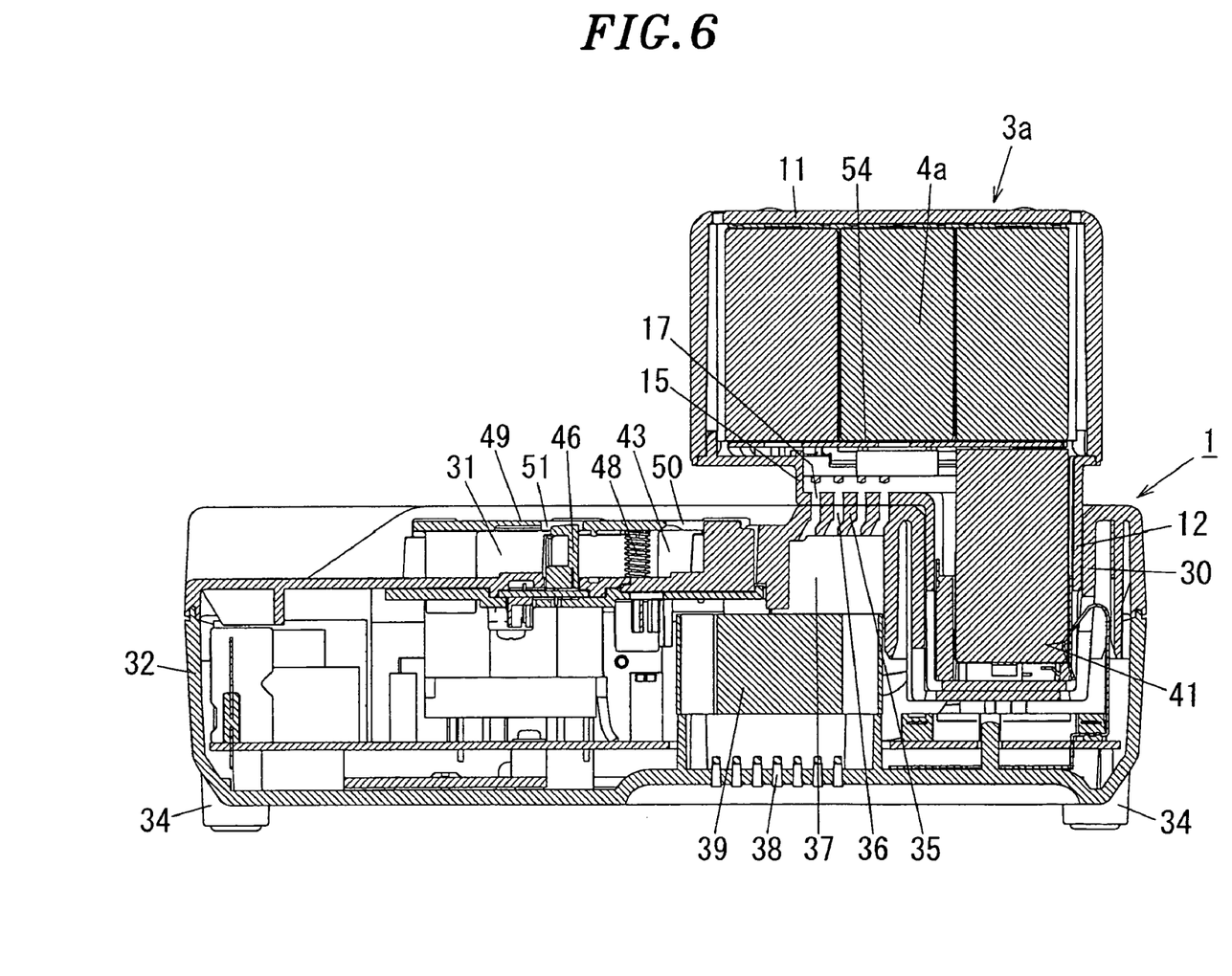
FIG. 6 is a sectional view showing the first battery pack mounted to the charging device of FIG. 1.

As shown in FIG. 6, when the first mounting boss 12 of the first battery pack 3a is inserted into the mounting bracket 30 of the charging device 1, the electrodes 13 of the first battery pack 3a are electrically connected to the respective first charging terminals 41, so that the first battery pack 3a is charged. Simultaneously, the first active connection terminal 14 of the first battery pack 3a is electrically connected to the first passive connection terminal 42.

Further, in the state in which the first mounting boss 12 is inserted into the first mounting bracket 30 and the first battery pack 3a is thus disposed at the position at which it is charged, a portion of the first case 11 of the first battery pack 3a is in contact with or is adjacent to the intermediate portion 35 of the charging device 1 and, simultaneously, the first vent port 17 of the support portion 15 of the first battery pack 3a faces the air supply port 36 of the intermediate portion 35 such that they correspond to each other when seen in a plan view. Therefore, when the first battery pack 3a is charged, air, which has been discharged through the air supply port 36 of the charging device 1 by the operation of the cooling fan 39, is supplied into the first case 11 of the first battery pack 3a through the first vent port 17, thus cooling the elements such as the cells 4a provided in the first battery pack 3a. Therefore, the first battery pack 3a is prevented from being heated to a high temperature while it is charged.

Figure 2:
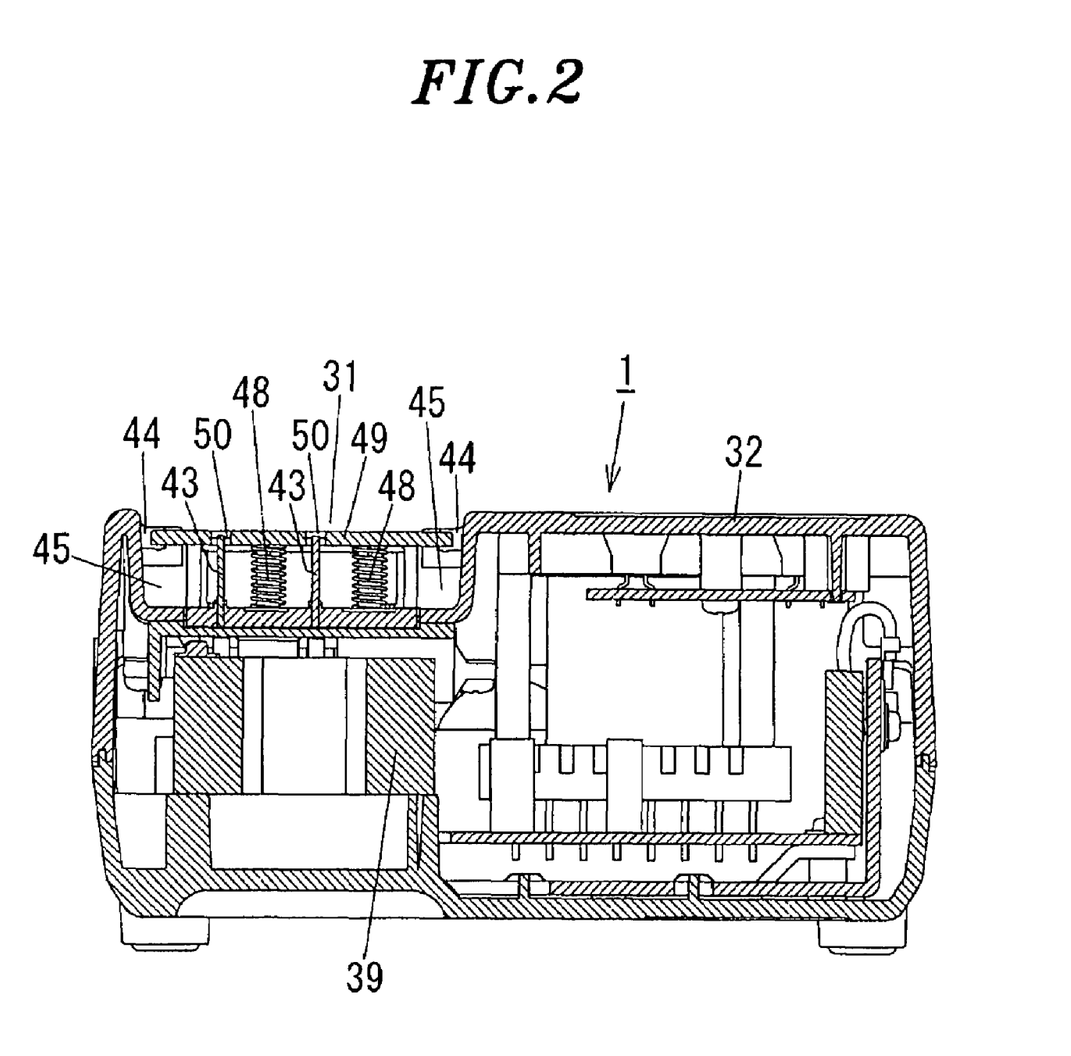
FIG. 2 illustrates a sectional view of the charging device of FIG. 1.

Meanwhile, as shown in FIG. 1, the second mounting bracket 31 includes a depressed portion, which is open at the upper end thereof and at the end opposite the first mounting bracket 30. Second charging terminals 43 protrude upwards from the end of the bottom of the second mounting bracket 31 that is adjacent to the first mounting bracket 30. Further, coupling catches 44 are provided in the second mounting bracket 31 at positions corresponding to the respective coupling protrusions 22 of the second battery pack 3b. As shown in FIG. 2, the coupling catches 44 protrude inwards from upper portions of inner surfaces of opposite sidewalls of the second mounting bracket 31. Furthermore, insertion slots 45 are defined under coupling the catches 44. Thus, horizontal parts 22b of the reverse L-shaped coupling protrusions 22 of the second battery pack 3b are inserted into the insertion slots 45 of the respective coupling catches 45. In addition, a device side connector 46 protrudes from the central portion of the bottom of the second mounting bracket 31. A second passive connection terminal 47 (see, FIG. 3) is provided in the device side connector 46.

As shown in FIGS. 1, 2 and 6, a movable support plate 49, which is elastically supported by springs 48, is provided above the bottom portion of the second mounting bracket 31. Notches 50 and a hole 51 are formed in the movable support plate 49 at positions corresponding to the second charging terminals 43, the coupling protrusions 44, and the device side connector 46 so as to allow the movable support plate 49 to pass thru the notches 50 and the hole 51. Thus, the movable support plate 49 is vertically movable in the second mounting bracket 31 between the normal state of FIG. 1 or 2, in which the movable support plate 49 is disposed at the upper position of the second mounting bracket 31, and the mounted state of FIG. 7, in which the movable support plate 49 is disposed at the lower position of the second mounting bracket 31 adjacent to the bottom of the second mounting bracket 31. In the state in which the second mounting boss 19 of the second battery pack 3b is not inserted into the second mounting bracket 31, the movable support plate 49 is maintained at the normal position by the springs 48, as shown in FIG. 1 or 2. In this state, the second charging terminals 43, the coupling catches 44 and the device side connector 46 may be disposed below the upper surface of the movable support plate 49.

Figure 7:
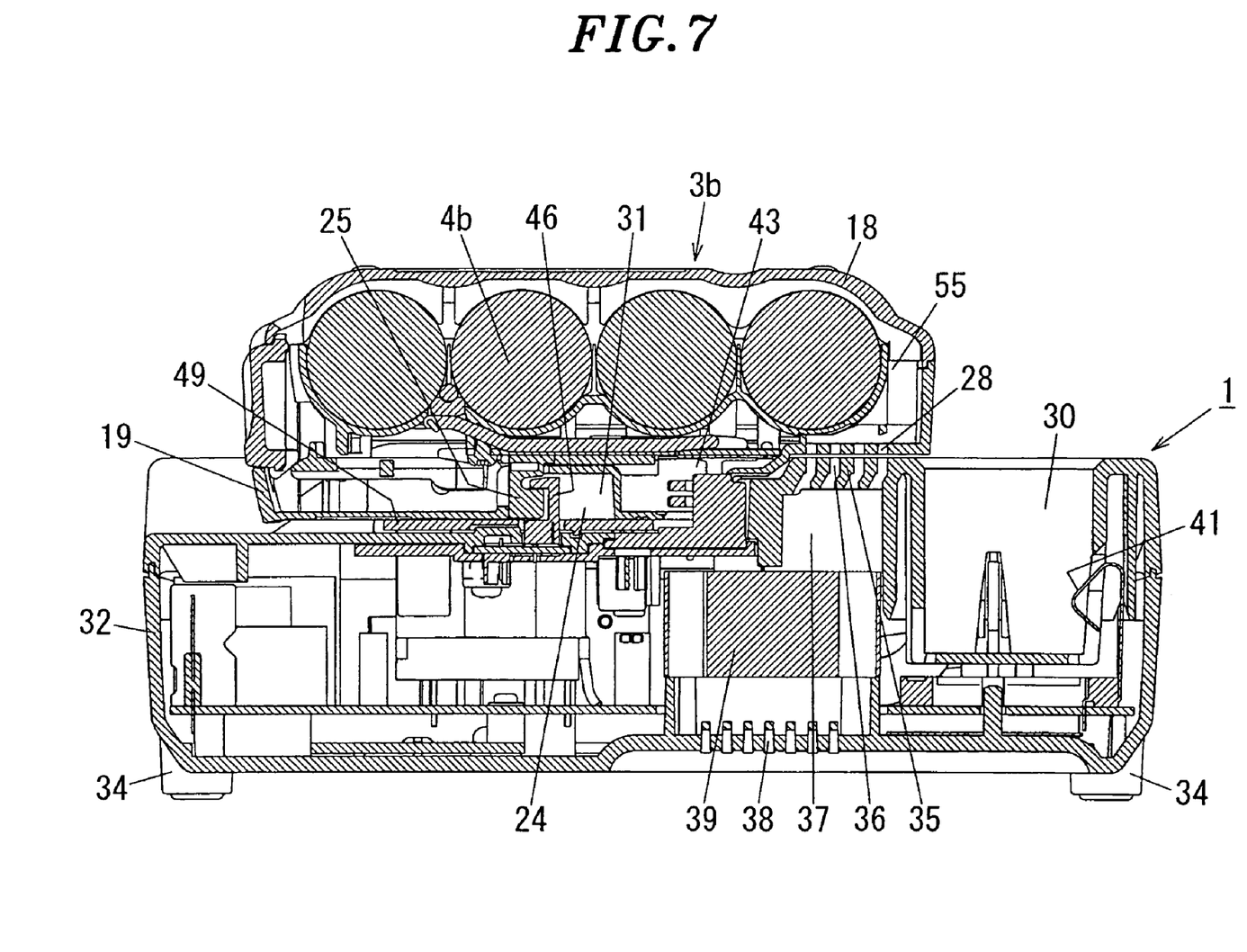
FIG. 7 is a sectional view showing the second battery pack mounted to the charging device of FIG. 1.

In the state in which the second mounting boss 19 of the second battery pack 3b is inserted into the second mounting bracket 31, as shown in FIG. 7, the electrodes 23 of the second battery pack 3b are electrically connected to the second charging terminals 43 to charge the second battery pack 3b, and, simultaneously, the second active connection terminal 26 of the second battery pack 3b is electrically connected to the second passive connection terminal 47.

To insert the second mounting boss 19 of the second battery pack 3b into the second mounting bracket 31 of the charging device 1, the second mounting boss 19 of the second battery pack 3b is first placed onto the upper surface of the movable support plate 49. Thereafter, the second battery pack 3b, along with the movable support plate 49, is pushed downwards to a position around the mounted state while overcoming the elasticity of the springs 48. Then, the coupling protrusions 22 of the second battery pack 3b are moved to pass thru a gap between the coupling catches 44. Then, the coupling protrusions 22 of the second battery pack 3b are inserted into the insertion slots 45 of the respective coupling catches 44, so that the coupling protrusions 22 are locked to the respective coupling catches 44. In addition, when the second battery pack 3b slides, the second charging terminals 43 of the charging device 1 are inserted into the respective terminal insertion slots 21 of the second battery pack 3b, thus the second charging terminals 43 are electrically connected to the respective electrodes 23 of the second battery pack 3b. Simultaneously, the battery side connector 25 of the second battery pack 3b is mechanically coupled to the device side connector 46 of the charging device 1, and the second active connection terminal 26 of the second battery pack 3b is electrically connected to the second passive connection terminal 47 of the charging device 1.

Furthermore, in the state in which the second mounting boss 19 is inserted into the second mounting bracket 31 and the second battery pack 3b is thus disposed at the position at which it is charged, a portion of the second case 18 of the second battery pack 3b is in contact with or is adjacent to the intermediate portion 35 of the housing 32 of the charging device 1 and, simultaneously, the second vent port 28 of the second case 18 faces the air supply port 36 of the intermediate portion 35 such that they correspond to each other when seen in a plan view. That is, the charging device 1 of the present invention is constructed such that, if the first battery pack 3a and the second battery pack 3b are respectively mounted to the first mounting bracket 30 and the second mounting bracket 31, in other words, if the first and second battery packs 3a and 3b are disposed at the same time at the positions at which they are charged, an interfering part 54 of the first battery pack 3a, which corresponds to the intermediate portion 35 of the charging device 1, interferes with an interfering part 55 of the second battery pack 3b, which corresponds to the intermediate portion 35 of the charging device 1. When the second battery pack 3b is charged, air, which has been discharged through the air supply port 36 of the charging device 1 by the operation of the cooling fan 39, is supplied into the second case 18 of the second battery pack 3b through the second vent port 28, thus cooling the elements such as the cells 4b provided in the second battery pack 3b. Thereby, the second battery pack 3b is prevented from being heated to a high temperature while it is charged. Furthermore, in the present invention, as described above, when the first battery pack 3a and the second battery pack 3b are mounted to the first mounting bracket 30 and the second mounting bracket 31, respectively, at the same time, the interfering part 54 of the first battery pack 3a and the interfering part 55 of the second battery pack 3b interfere with each other. Therefore, the first battery pack 3a and the second battery pack 3b are prevented from being mounted to and charged by the charging device 1 at the same time.

Here, the charging device 1 includes a conversion unit for supplying electricity to the first charging terminals 41 when the electrodes 13 of the first battery pack 3a are connected to respective first charging terminals 41 and for supplying electricity to the second charging terminals 43 when the electrodes 23 of the second battery pack 3b are connected to respective second charging terminals 43. The conversion unit will be described herein below.

Figure 3:
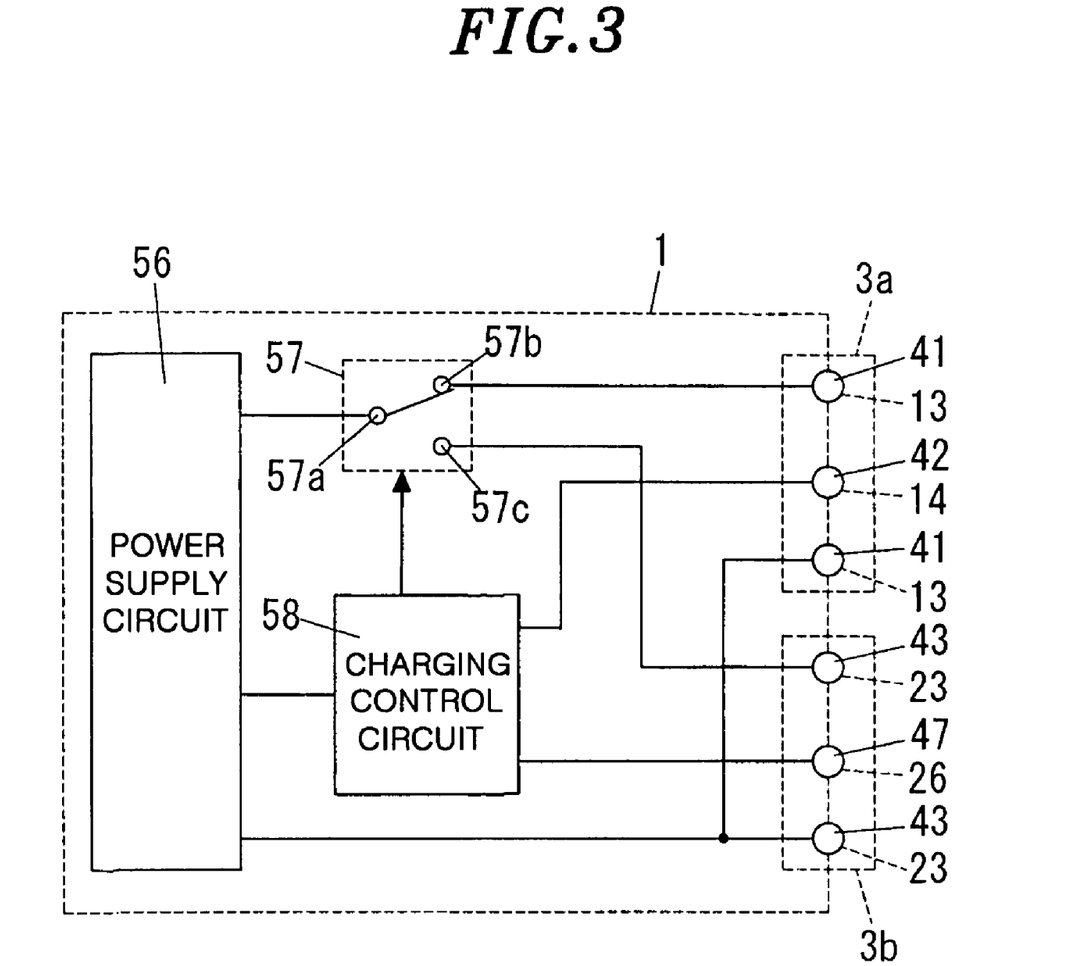
FIG. 3 depicts a block diagram of the charging device of FIG. 1.

As shown in the block diagram of FIG. 3, the charging device 1 includes a power circuit 56, which is connected to an outer power supply, which is a power supply for charging, and is not shown in the drawings, in order to supply electricity for charging. The power circuit 56 is provided with two power leads, where one of the power leads is configured to be connected to one of the first and the second charging terminals 41 and 43. Further, the other power lead is connected to a common terminal 57a of a conversion relay 57. Further, a first output electrode 57b, e.g., a normally closed terminal, of the conversion relay 57 (which is a terminal connected in a demagnetized state) is connected to the first charging terminal 41, to thus be connected to the corresponding electrode 13 of the first battery pack 3a. In addition, a second output electrode 57c, e.g., a normally open terminal, of the conversion relay 57 (which is a terminal disconnected in a demagnetized state) is connected to a remaining one of the second charging terminals 43, to thus be connected to the corresponding electrode 23 of the second battery pack 3b. In addition, the charging device 1 includes a charging control circuit 58 therein. The charging control circuit 58 is connected both to the first passive connection terminal 42, to which the first active connection terminal 14 of the first battery pack 3a is connected, and to the second passive connection terminal 47, to which the second active connection terminal 26 of the second battery pack 3b is connected.

The charging control circuit 58 constituting a control unit is set such that, when the first active connection terminal 14 of the first battery pack 3a is connected to the first passive connection terminal 42, the contact point of the conversion relay 57 is switched to the normally closed terminal 57b, and, when the second active connection terminal 26 of the second battery pack 3b is connected to the second passive connection terminal 47, the contact point of the conversion relay 57 is switched to the normally open terminal 57c. In other words, in the case where the electrodes 13 of the first battery pack 3a are connected to the first charging terminals 41, the contact point of the conversion relay 57 is switched to the normally closed terminal 57b. In the case where the electrodes 23 of the second battery pack 3b are connected to the second charging terminals 43, the contact point of the conversion relay 57 is switched to the normally open terminal 57c. Therefore, when the first mounting boss 12 of the first battery pack 3a is mounted to the first mounting bracket 30 of the charging device 1, the charging device 1 is set such that the first battery pack 3a can be charged. When the second mounting boss 19 of the second battery pack 3b is mounted to the second mounting bracket 31 of the charging device 1, the charging device 1 is set such that the second battery pack 3b can be charged.

As such, in the present invention, the single charging device 1 can charge two different kinds of battery packs, that is, first and second battery packs 3a and 3b. Furthermore, the charging device 1 can automatically and selectively supply electricity from the single charging power supply to the first charging terminal 41 or the second charging terminal 43 using the conversion relay 57. Therefore, in the charging device 1, the single charging power supply is used both as a charging power supply for the first charging terminal 41 and a charging power supply for the second charging terminal 43, so that a reduction in size of the charging device 1 can be realized. As well, the single cooling fan 39 can cool the first battery pack 3a, which is mounted to the first mounting bracket 30, and can cool the second battery pack 3b, which is mounted to the second mounting bracket 31. As such, the cooling fan 39 can be used as a fan for both the first and second battery packs 3a, thus a reduction in size of the charging device 1 can be realized.

While the invention has been shown and described with respect to the embodiments, it will be understood by those skilled in the art that various changes and modification may be made without departing from the scope of the invention as defined in the following claims.

What is claimed is:

1. A charging device for charging battery packs, comprising:

charging terminals including a first charging terminal to be connected to an electrode of a first battery pack and a second charging terminal to be connected to an electrode of a second battery pack, the first and the second battery packs being different in kind; and a conversion unit for supplying electricity to the first charging terminal and not supplying electricity to the second charging terminal when the electrode of the first battery pack is connected to the first charging terminal, and supplying electricity to the second charging terminal and not supplying electricity to the first charging terminal when the electrode of the second battery pack is connected to the second charging terminal, wherein the charging device is configured to allow only one of the first and the second battery packs to be mounted at a time.

2. The charging device of claim 1, wherein the conversion unit includes:

a conversion relay having a common terminal connected to a charging power supply of the charging device, a first relay terminal connected to the first charging terminal, and a second relay terminal connected to the second charging terminal; and a control unit connecting the common terminal to the first relay terminal and disconnecting the common terminal to the second relay terminal when the electrode of the first battery pack is connected to the first charging terminal, and connecting the common terminal to the second relay terminal and disconnecting the common terminal to the first relay terminal when the electrode of the second battery pack is connected to the second charging terminal.

3. The charging device of claim 1, further comprising a first mounting bracket for mounting the first battery pack thereto, and a second mounting bracket for mounting the second battery pack thereto, wherein the first charging terminal is provided in the first mounting bracket, and the second charging terminal is provided in the second mounting bracket.

4. The charging device of claim 1, wherein the first charging terminal serves to charge the first battery pack which includes a nickel-cadmium battery or a nickel metal hydride battery, and the second charging terminal serves to charge the second battery pack which includes a lithium-ion battery.

5. A charging device for charging battery packs, comprising:

charging terminals including a first charging terminal to be connected to an electrode of a first battery pack and a second charging terminal to be connected to an electrode of a second battery pack, the first and the second battery packs being different in kind; and a conversion unit for supplying electricity to the first charging terminal when the electrode of the first battery pack is connected to the first charging terminal and supplying electricity to the second charging terminal when the electrode of the second battery pack is connected to the second charging terminal, wherein the charging device is configured to allow only one of the first and the second battery pack to be mounted at a time;

wherein the conversion unit includes:

a conversion relay having a common terminal connected to a charging power supply of the charging device, a first relay terminal connected to the first charging terminal, and a second relay terminal connected to the second charging terminal; and a control unit connecting the common terminal to the first relay terminal when the electrode of the first battery pack is connected to the first charging terminal, and connecting the common terminal to the second relay terminal when the electrode of the second battery pack is connected to the second charging terminal; and wherein the first battery pack and the second battery pack are connected to the common terminal through the first and the second charging terminals, respectively.

6. The charging device of claim 1, wherein the conversion relay selectively connects the first relay terminal or the second relay terminal to the common terminal.

7. A charging device for charging battery packs comprising:

charging terminals including a first charging terminal to be connected to an electrode of a first battery pack and a second charging terminal to be connected to an electrode of a second battery pack, the first and the second battery packs being different in kind; and a conversion unit for supplying electricity to the first charging terminal when the electrode of the first battery pack is connected to the first charging terminal and supplying electricity to the second charging terminal when the electrode of the second battery pack is connected to the second charging terminal, wherein the charging device is configured to allow only one of the first and the second battery pack to be mounted at a time;

wherein the conversion unit includes:

a conversion relay having a common terminal connected to a charging power supply of the charging device, a first relay terminal connected to the first charging terminal, and a second relay terminal connected to the second charging terminal; and a control unit connecting the common terminal to the first relay terminal when the electrode of the first battery pack is connected to the first charging terminal, and connecting the common terminal to the second relay terminal when the electrode of the second battery pack is connected to the second charging terminal;

and wherein the charging device further comprises a first and a second passive connection terminal, wherein each of the first and the second battery pack includes an active connection terminal, wherein the conversion unit connects the common terminal to the first relay terminal when the electrode and the active connection terminal of the first battery pack are connected to the first charging terminal and the first passive connection terminal, respectively and the conversion unit connects the common terminal to the second relay terminal when the electrode and the active connection terminal of the second battery pack are connected to the second charging terminal and the second passive connection terminal, respectively.

8. The charging device of claim 1, further comprising:

a mounting portion including a first mounting bracket for receiving the first battery pack and a second mounting bracket for receiving the second battery pack, wherein the mounting portion is configured such that the first battery pack and the second battery pack are prevented from being mounted on the charging device at the same time.

9. The charging device of claim 5, further comprising a first mounting bracket for mounting the first battery pack thereto, and a second mounting bracket for mounting the second battery pack thereto, wherein the first charging terminal is provided in the first mounting bracket, and the second charging terminal is provided in the second mounting bracket.

10. The charging device of claim 5, wherein the first charging terminal serves to charge the first battery pack which includes a nickel-cadmium battery or a nickel metal hydride battery, and the second charging terminal serves to charge the second battery pack which includes a lithium-ion battery.

11. The charging device of claim 5, wherein the conversion relay selectively connects the first relay terminal or the second relay terminal to the common terminal.

12. The charging device of claim 5, further comprising:

a mounting portion including a first mounting bracket for receiving the first battery pack and a second mounting bracket for receiving the second battery pack, wherein the mounting portion is configured such that the first battery pack and the second battery pack are prevented from being mounted on the charging device at the same time.

13. The charging device of claim 7, further comprising a first mounting bracket for mounting the first battery pack thereto, and a second mounting bracket for mounting the second battery pack thereto, wherein the first charging terminal is provided in the first mounting bracket, and the second charging terminal is provided in the second mounting bracket.

14. The charging device of claim 7, wherein the first charging terminal serves to charge the first battery pack which includes a nickel-cadmium battery or a nickel metal hydride battery, and the second charging terminal serves to charge the second battery pack which includes a lithium-ion battery.

15. The charging device of claim 7, wherein the conversion relay selectively connects the first relay terminal or the second relay terminal to the common terminal.

16. The charging device of claim 7, further comprising:

a mounting portion including a first mounting bracket for receiving the first battery pack and a second mounting bracket for receiving the second battery pack, wherein the mounting portion is configured such that the first battery pack and the second battery pack are prevented from being mounted on the charging device at the same time.

\* \* \* \* \*